United States Patent
Shoor et al.

(10) Patent No.: US 7,920,649 B2
(45) Date of Patent: Apr. 5, 2011

(54) RECOVERING PRECODED DATA USING A MUELLER-MÜLLER RECOVERY MECHANISM

(75) Inventors: Ehud Shoor, Haifa (IL); Adee Ran, Maayan Baruch (IL); Amir Mezer, Haifa (IL)

(73) Assignee: Intel Corporation, Santa Clara, CA (US)

( * ) Notice: Subject to any disclaimer, the term of this patent is extended or adjusted under 35 U.S.C. 154(b) by 1041 days.

(21) Appl. No.: 11/729,709

(22) Filed: Mar. 29, 2007

(65) Prior Publication Data

US 2008/0240318 A1    Oct. 2, 2008

(51) Int. Cl.
*H03K 9/00* (2006.01)
(52) U.S. Cl. .......................................... 375/316
(58) Field of Classification Search .................. 375/316, 375/324, 326, 327, 328, 354, 355, 373, 376
See application file for complete search history.

(56) References Cited

U.S. PATENT DOCUMENTS

| 4,896,334 | A | * | 1/1990 | Sayar | 375/293 |
| RE34,206 | E | * | 3/1993 | Sayar | 375/293 |
| 5,552,942 | A | * | 9/1996 | Ziperovich et al. | 360/51 |
| 6,985,549 | B1 | * | 1/2006 | Biracree et al. | 375/355 |
| 7,519,137 | B2 | * | 4/2009 | Murray et al. | 375/355 |
| 2006/0067434 | A1 | * | 3/2006 | Kovintavewat et al. | 375/340 |
| 2007/0133719 | A1 | * | 6/2007 | Agazzi et al. | 375/341 |
| 2010/0054318 | A1 | * | 3/2010 | Chien et al. | 375/226 |

OTHER PUBLICATIONS

U.S. Appl. No. 11/394,925, filed Mar. 31, 2006, entitled, "Techniques to Converge and Adapt a Communication System Receiver," by Amir Mezer, et al.

* cited by examiner

*Primary Examiner* — Chieh M Fan
*Assistant Examiner* — Jaison Joseph
(74) *Attorney, Agent, or Firm* — Trop, Pruner & Hu, P.C.

(57) ABSTRACT

In one embodiment, the present invention includes an apparatus having a digital signal processor (DSP) coupled to receive a digitized signal. The DSP may be controlled to perform a timing recovery mechanism that implements a Mueller and Müller (MM)-based algorithm to generate a sensor output responsive to the digitized signal, where the incoming signal is non-linearly precoded in a transmitter from which the signal is received. Other embodiments are described and claimed.

18 Claims, 2 Drawing Sheets

RECOVERING PRECODED DATA USING A MUELLER-MÜLLER RECOVERY MECHANISM

BACKGROUND

Most digital communication systems require synchronization between near-end and far-end link partners to operate properly. A common method to obtain clock synchronization in a receiver is to extract the far-end clock from the received signal. One timing recovery method used in many communications devices is based on the well-known Mueller and Müller (MM) algorithm, and obtains a recovered clock based on one of two timing functions, in which it is assumed that the channel between the link partners is linear.

While this assumption is reasonable for many communications systems, since both a modulator of a transmitter and a physical medium that couples the partners may be considered linear, there are some communication systems where this linearity condition is not fulfilled. One example is the case of systems that employ Tomlinson-Harashima-Precoding (THP), which is a method for combating inter-symbol interference (ISI) in the transmitter side, with no significant peak-to-average ratio enlargement. This method was adopted by the Institute of Electrical and Electronics Engineers (IEEE) for its so-called 10GBASE-T, i.e., Draft Amendment P802.3an/Draft 3.1, 2005 standard, and is also used in many other communication systems and standards, e.g., asynchronous digital subscriber line (ADSL). Thus in many systems, clock recovery based on a MM algorithm is not possible.

DETAILED DESCRIPTION

Figure 1:
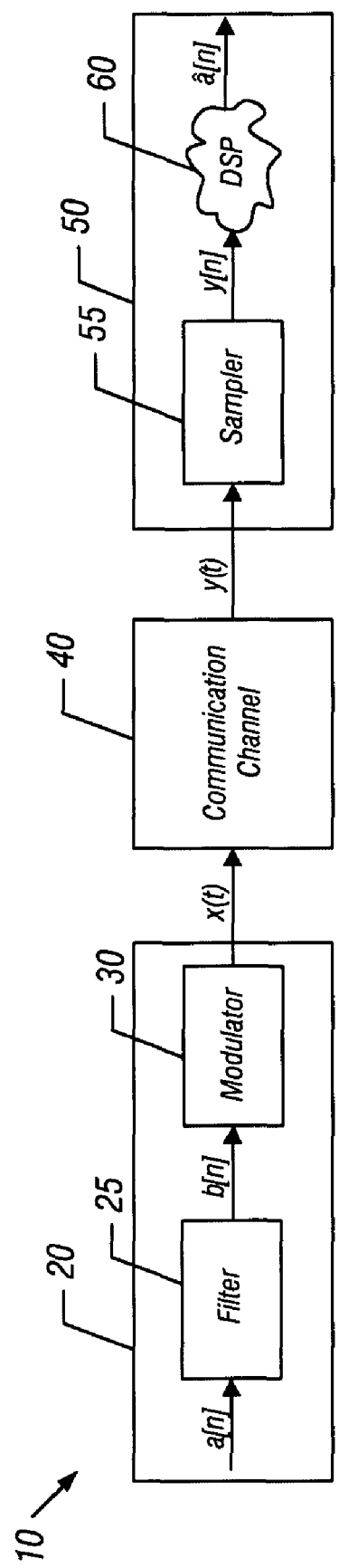
FIG. 1 is a block diagram of a system in accordance with an embodiment of the present invention.

Referring now to FIG. 1, shown is a block diagram of a system in accordance with an embodiment of the present invention. As shown in FIG. 1, system 10 may be a portion of a communication system in which a first system includes a network interface having a transmitter 20 that is coupled through a communication channel 40 to a second system including a network interface having a receiver 50. These network interfaces of the first and second systems may represent any network interface suitable for use with a number of different Ethernet techniques such as an IEEE 802.3an protocol or other digital communication protocol such as an ADSL protocol, although the scope of the present invention is not limited in this regard. During communication between these systems, various channel impairments such as near-end and far-end echo and cross-talk may occur, as well as other channel impairments such as signal attenuation or others due to characteristics of the physical medium. Transmitter 20 may be a transmitter of a physical (PHY) unit that in turn is coupled to a media access control (MAC) unit of the first system (not shown in FIG. 1). As shown in FIG. 1, transmitter 20 includes a filter 25, i.e., a THP filter, that is coupled to receive symbols a[n] and output the series b[n] to a modulator 30. The relation between a[n] and b[n] is non-linear.

In turn, modulator 30 modulates the output series to generate an output signal x(t) that is provided to communication channel 40, which may be a physical medium that may be, for example, a standard cable such as a gigabit Ethernet cable.

Various signal impairments through channel 40 may cause transformation of the output signal x(t) to become y(t) that is provided to a sampler 55 of receiver 50. Sampler 55 may include various components to perform analog front-end processing and other operations. The resulting signal y[n] is provided to a digital signal processor (DSP) 60 that may process the received signal to generate a slicer output â[n] corresponding to a decision for the transmitted signal a[n] at the output of receiver 50.

Note that in the embodiment of FIG. 1, a THP, i.e., non-linear, transmission scheme is implemented and a modified MM algorithm may be used to recover a clock signal from the received non-linear signal. While shown with this particular implementation, the scope of the present invention is not limited in this regard.

The relationship between the THP input series $a_n$ and its output series $b_n$ is as follows:

$$b[n] = a[n] - \sum_{i=1}^{N} \beta_i \cdot b[n-i] + M_n \cdot 2L \quad [\text{EQ. 1}]$$

where $\{\beta_i\}$ is the THP filter coefficient set and N is the number of THP filter coefficients. The term $M_n \cdot 2L$ is derived from the THP algorithm in order to ensure a limited transmit range. When the required range is $[-L,L]$, $M_n$ is an integer reflecting the required expansion factor, computed using a modulo operation. At the receiver, the modulo operation is used again to remove this term.

In a basic form of system 10 of FIG. 1, it is not possible to use receiver decisions $\{\hat{a}_n\}$ to recover the clock, since the received signal is not a linear function of the transmitted symbols $\{a_n\}$. Trying to do so will lead to erroneous implementation and malfunctioning of the timing recovery algorithm. Therefore, a conventional Mueller and Müller algorithm cannot be used in a system that employs THP encoding. Embodiments may thus adapt the Mueller and Müller algorithm to THP transmission by changing the algorithm formulation such that a linearization of the problem is obtained.

Since the basic problem of a conventional MM interaction with THP transmission is derived from the non-appropriate relationship between $\{a_n\}$ and the received signal, embodiments may generate an estimation for the THP encoder output series $\{b_n\}$ in the receiver (denoted as $\{\hat{b}_n\}$) and use it instead of the receiver decisions $\{\hat{a}_n\}$ for clock recovery purposes.

Since the relationship between $\{b_n\}$ and the received signal is linear, embodiments operate well when referring to $\{\hat{b}_n\}$ as the receiver decisions. This approach is statistically valid since a THP filter output is independent identically-distributed (iid), exactly as $\{a_n\}$.

Using a MM algorithm in a system, to lock onto the phase of a transmitter, a timing function may be defined such that the function is positive if the sampling phase is early, negative if the sampling phase is late (or vice-versa), and zero at the target phase. Hence, a sampler may adapt its phase accordingly. Two versions of a timing recovery solution may be implemented, following an MM algorithm. Specifically, the first type of timing recovery may be referred to as a "Type-A" mechanism, where a sampling phase, $\phi$, is set such that:

$$h(1 \cdot T + \phi) = h(-1 \cdot T + \phi) \quad [\text{EQ. 2}]$$

where h is the overall system pulse response, T is the symbol duration, and $\phi$ is the sampling phase which is required to be set by a timing-recovery mechanism. Note that the sampling time difference between two consecutive samples (n,n+1) is T. This is referred to as baud-rate sampling.

A "Type-B' mechanism may be implemented where φ is set such that:

$$h(1 \cdot T + \phi) = 0 \quad \text{[EQ. 3]}$$

Thus in a system implementing a "Type-A" MM clock recovery algorithm in accordance with an embodiment of the present invention to recover timing information from THP encoded data, the following timing function may be realized:

$$f_{THP}(\tau) = \frac{1}{E[b_n^2]} E\left[\hat{b}_{n-1} \cdot y_n - \hat{b}_n \cdot y_{n-1}\right] \quad \text{[EQ. 4]}$$

where $E[.]$ denotes a statistical expected value, $y_n$ is the sampled signal at the receiver, and $\hat{b}_n$ is the estimation of THP encoder output series $\{\hat{b}_n\}$ as determined in the receiver.

In a system implementing a "Type-B" MM clock recovery algorithm, the following timing function may be realized:

$$f_{THP}(\tau) = \frac{1}{E[b_n^2]} E\left[\hat{b}_{n-1} \cdot err_n\right] \quad \text{[EQ. 5]}$$

Note that for a Type-B implementation, it is possible to follow the linearized system parameters and generate an error signal which refers to $\hat{b}_n$, but it is also possible to use the available slicer error signal, which refers to $\hat{a}_n$, since it maintains the relevant statistical properties even after THP decoding.

With regard to EQs. 4 and 5 above, the $\{\hat{b}_n\}$ series is not given at the receiver. However, it may be calculated based on the receiver decisions $\{\hat{a}_n\}$ and the THP non-linear factor estimations $\{\hat{M}_n\}$, both of which are available at the receiver. In one embodiment, the following equation may be used $\{\hat{b}_n\}$ for estimation:

$$\hat{b}[n] = \hat{a}[n] - \sum_{i=1}^{N} \beta_i \cdot \hat{b}[n-i] + \hat{M}_n \cdot 2L \quad \text{[EQ. 6]}$$

where $\{\beta_i\}$ denotes the given THP filter coefficient set, and N is the number of THP filter coefficients. Thus the THP filter coefficients for the far-end transmitter may be generated in the receiver and provided to the far-end transmitter.

Figure 2:
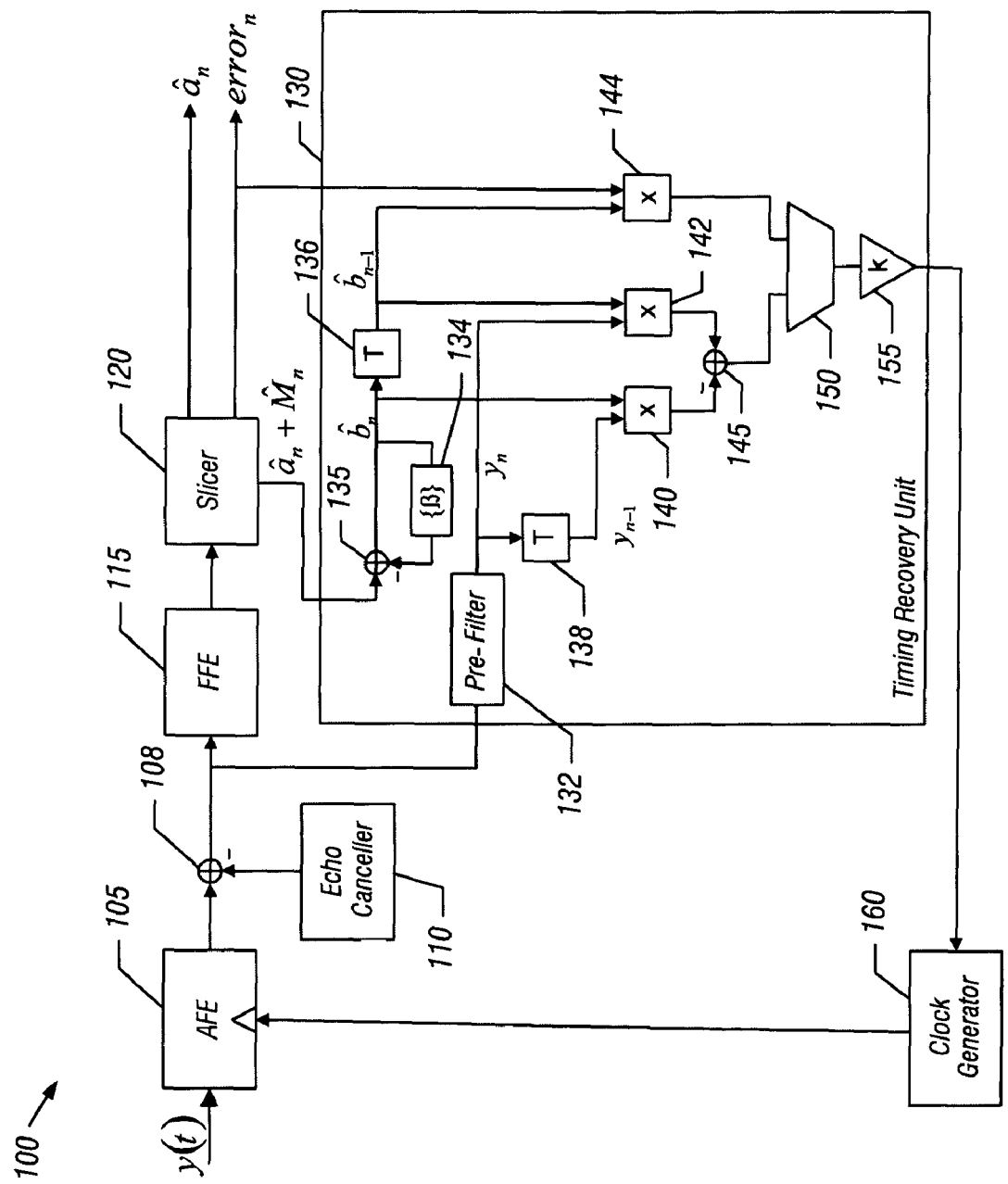
FIG. 2 is a block diagram of a portion of a receiver in accordance with an embodiment of the present invention.

Referring now to FIG. 2, shown is a block diagram of a portion of a receiver in accordance with an embodiment of the present invention. As shown in FIG. 2, the portion of receiver 100 shown in FIG. 2 may correspond to a PHY unit of the receiver. As shown in FIG. 2, an incoming signal received from a communication channel, y(t), is coupled to an analog front end unit (AFE) 105. As will be described further below, AFE 105 is clocked by a sampling clock recovered from the received signal. AFE 105 may perform various front end processing, such as conversion of the analog signal into digital form, preprocessing and sampling. The sampled signal may be output from AFE 105 and provided to a summer 108 which acts to remove echo from the signal that is provided to summer 108 from AFE 105 by an echo canceller 110. The echo-cancelled signal is then provided to a feed forward equalizer (FFE) 115, where equalization may be performed to remove channel distortion. The resulting signal is then provided to a slicer 120 which may decode the symbol and generate a decision, i.e., a decision symbol $\hat{a}_n$. Furthermore, slicer 120 may generate an error signal, $error_n$.

Referring still to FIG. 2, the decision symbol, as well as a non-linear factor estimation, namely the THP non-linear factor estimation $\hat{M}_n$, may be provided to a timing recovery unit 130. In various embodiments, timing recovery unit 130 may be a timing recovery loop that supports MM type A and/or type B algorithms as modified and described herein. As shown, the output of slicer 120 is provided to a summer 135 which also receives the output of a filter generator 134, which utilizes the THP filter coefficients $\{\beta\}$. Thus the output of summer 135 is the estimation for the THP encoder output series $[b_N]$ (i.e., $[\hat{b}_n]$). This estimation signal, as shown in FIG. 2, is provided to a first delay element 136 (i.e., having a delay of T) to thus provide a delayed output $\hat{b}_{n-1}$.

As further shown in FIG. 2, the echo cancelled signals output from summer 108 may also be provided to a pre-filter 132 that may be used to synchronize the internal delays or to perform post-processing for the sampled data. The output of pre-filter 132, corresponding to $y_n$, may be coupled to a second delay element 138 (also having a delay of T) that thus outputs a delayed version, $y_{n-1}$.

Still referring to FIG. 2, a plurality of multipliers 140, 142 and 144 are coupled to receive the estimation of the THP encoder output series (or a delayed version thereof) and the pre-filtered sampled data $y_n$ (to multiplier 142) or a delayed version thereof (to multiplier 140). The outputs of multipliers 140 and 142 may be combined in a summer 145, the output of which is coupled to a multiplexer 150. This output of summer 145 may correspond to an output of a type A sensor, i.e., according to the type A timing recovery algorithm of Equation 4. Note that multiplier 144 that receives a delayed version of the estimated THP encoder output series $\hat{b}_{n-1}$ and further receives the error signal from slicer 120 and provides its output, which corresponds to a type B sensor, i.e., in accordance with Equation 5, to multiplexer 150. Multiplexer 150 may be controlled by a selector signal that selects the Type A or Type B operation (some applications may support only one of the types, and thus the control of multiplexer 150 may be fixed, or multiplexer 150 may not be present). The selected output of multiplexer 150 may be amplified in a gain block 155 having a gain k. Thus the sensor output of timing recovery unit 130 is provided to a clock generator 160, which in turn generates the sampling clock for AFE 105 from this recovered information from the incoming signal. While shown with this particular implementation in the embodiment of FIG. 2, the scope of the present invention is not limited in this regard.

Thus in various embodiments, a receiver, such as may be present in a PHY unit of a 10GbaseT or ADSL system may achieve robust phase-locking while operating in a THP communications system. That is, embodiments allow use of a Mueller and Müller-type algorithm for clock recovery from a received signal in a THP communications systems, which otherwise could not be supported by an original setting due to the non-linear nature of the transmission.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   an analog portion to receive an incoming signal from a communication channel and generate a digitized signal;
   a digital portion coupled to receive the digitized signal, the digital portion including a timing recovery unit that is to implement a Mueller and Müller (MM)-based algorithm to generate a sensor output responsive to the digitized signal, wherein the incoming signal is non-linearly precoded in a transmitter coupled to the communication channel; and
   a clock generator to generate a receiver clock from an output of the timing recovery unit and to clock the analog portion with the receiver clock, where the non-linear precoding comprises Tomlinson-Harashima precoding.

2. The apparatus of claim 1, wherein the timing recovery unit comprises:
   a first summer to receive at a first input an output of a decision unit, the output including a decision signal corresponding to the digitized signal and a non-linear factor estimation, and at a second input a coefficient set for the non-linear precoding used in the transmitter.

3. The apparatus of claim 2, wherein the timing recovery unit further comprises:
   a first delay element coupled to an output of the first summer;
   a pre-filter coupled to receive and filter the digitized signal; and
   a second delay element coupled to the pre-filter output.

4. The apparatus of claim 3, wherein the timing recovery unit further comprises:
   a first multiplier to combine the outputs of the second delay element and the first summer;
   a second multiplier to combine the outputs of the pre-filter and the first delay element; and
   a second summer to combine the outputs of the first and second multipliers.

5. The apparatus of claim 4, further comprising a third multiplier to combine an error output of the decision unit and the output of the first delay element.

6. The apparatus of claim 5, further comprising a multiplexer to receive the outputs of the second summer and the third multiplier and select an output based on a selected MM-based algorithm.

7. A method comprising:
   receiving an input signal in a receiver, the input signal precoded with a non-linear function in a transmitter coupled to the receiver by a communication channel, the precoding comprising Tomlinson-Harashima precoding;
   recovering data from the input signal in a decision unit; and
   recovering a clock from the input signal in a clock recovery unit employing a Mueller and Müller (MM)-based algorithm.

8. The method of claim 7, further comprising generating a filter coefficient set for the non-linear function in the receiver and transmitting the filter coefficient set to the transmitter for precoding the input signal.

9. The method of claim 8, further comprising:
   summing an output of a decision unit of the receiver, the output including a decision symbol corresponding to the input signal and a non-linear factor estimation, with the filter coefficient set to obtain a first sum.

10. The method of claim 9, further comprising:
    delaying the first sum, and providing the delayed first sum to a first multiplier and a second multiplier;
    multiplying the delayed first sum with a pre-filtered version of the incoming signal in the first multiplier;
    multiplying the delayed first sum with an error output of the decision unit in the second multiplier; and
    multiplying the first sum with a delayed version of the pre-filtered version in a third multiplier.

11. The method of claim 10, further comprising:
    combining an output of the first multiplier and the third multiplier; and
    selecting the combined output or the output of the second multiplier and providing the selected output to a clock generator to generate a sampling clock for an analog portion of the receiver.

12. The method of claim 11, further comprising performing the selecting based on a selected MM-based algorithm.

13. An apparatus comprising:
    an analog portion to receive an incoming signal from a communication channel and generate a digitized signal; and
    a digital portion coupled to receive the digitized signal, the digital portion including a timing recovery unit that is to implement a Mueller and Müller (MM)-based algorithm to generate a sensor output responsive to the digitized signal, wherein the incoming signal is non-linearly precoded in a transmitter coupled to the communication channel, the timing recovery unit comprising a first summer to receive at a first input an output of a decision unit, the output including a decision signal corresponding to the digitized signal and a non-linear factor estimation, and at a second input a coefficient set for the non-linear precoding used in the transmitter.

14. The apparatus of claim 13, wherein the timing recovery unit further comprises:
    a first delay element coupled to an output of the first summer;
    a pre-filter coupled to receive and filter the digitized signal; and
    a second delay element coupled to the pre-filter output.

15. The apparatus of claim 14, wherein the timing recovery unit further comprises:
    a first multiplier to combine the outputs of the second delay element and the first summer;
    a second multiplier to combine the outputs of the pre-filter and the first delay element; and
    a second summer to combine the outputs of the first and second multipliers.

16. The apparatus of claim 15, further comprising:
    a third multiplier to combine an error output of the decision unit and the output of the first delay element; and
    a multiplexer to receive the outputs of the second summer and the third multiplier and select an output based on a selected MM-based algorithm.

17. The apparatus of claim 13, further comprising a clock generator to generate a receiver clock from an output of the timing recovery unit and to clock the analog portion with the receiver clock, where the non-linear precoding comprises Tomlinson-Harashima precoding.

18. The apparatus of claim 13, wherein the apparatus is to generate a filter coefficient set for the non-linear precoding and transmit the filter coefficient set to the transmitter for precoding the incoming signal.

* * * * *